United States Patent
Ewen et al.

(10) Patent No.: US 11,276,221 B1
(45) Date of Patent: Mar. 15, 2022

(54) CREATING AN ANIMATED PICTOGRAM

(71) Applicant: International Business Machines Corporation, Armonk, NY (US)

(72) Inventors: Christian Ewen, New York, NY (US); Florian Pinel, New York, NY (US); Donna K. Byron, Petersham, MA (US); Carmine M. DiMascio, West Roxbury, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/159,535

(22) Filed: Jan. 27, 2021

(51) Int. Cl.
*G06T 13/80* (2011.01)
*G06T 13/60* (2011.01)
*G01W 1/00* (2006.01)

(52) U.S. Cl.
CPC ............ *G06T 13/80* (2013.01); *G06T 13/60* (2013.01); *G01W 1/00* (2013.01); *G06T 2213/12* (2013.01)

(58) Field of Classification Search
CPC ..... G06T 13/80; G06T 2213/12; G06T 13/60; G01W 1/00
See application file for complete search history.

(56) References Cited

U.S. PATENT DOCUMENTS

| | | | | |
|---|---|---|---|---|
| 5,379,215 A * | 1/1995 | Kruhoeffer | ............ | G06T 15/10 702/3 |
| 6,496,780 B1 * | 12/2002 | Harris | ............ | G01W 1/04 702/3 |
| 6,961,061 B1 * | 11/2005 | Johnson | ............ | G06T 15/503 345/473 |
| 7,043,368 B1 * | 5/2006 | Cote | ............ | G01W 1/10 345/419 |
| 7,752,188 B2 * | 7/2010 | Lagerstedt | ............ | G06Q 10/109 707/705 |
| 8,707,352 B1 * | 4/2014 | Crespo | ............ | G01W 1/10 725/35 |
| 9,613,270 B2 | 4/2017 | Sun et al. | | |
| 10,021,524 B2 | 7/2018 | Chu et al. | | |
| 2003/0206182 A1 * | 11/2003 | Kelly | ............ | H04N 5/44513 345/632 |
| 2011/0076992 A1 * | 3/2011 | Chou | ............ | G06Q 10/00 455/414.1 |

(Continued)

FOREIGN PATENT DOCUMENTS

| | | |
|---|---|---|
| CN | 106888320 A | 6/2017 |
| DE | 10313653 B4 | 7/2005 |
| WO | 9826306 A1 | 6/1998 |

OTHER PUBLICATIONS

Bisantz et al., "Visual Representations of Meta-Information", Journal of Cognitive Engineering and Decision Making, vol. 3, No. 1, Spring 2009, pp. 67-91, DOI 10.1518/155534309X433726, © 2009 Human Factors and Ergonomics Society, All rights reserved.

(Continued)

*Primary Examiner* — King Y Poon
*Assistant Examiner* — Vincent Peren
(74) *Attorney, Agent, or Firm* — David K. Mattheis; Maeve M. Carpenter

(57) ABSTRACT

Creating an animated pictogram includes: generating a set of images depicting a weather forecast for a first location at different times according to a set of depiction rules and combining the set of images in chronological order according to a set of transition rules.

9 Claims, 8 Drawing Sheets

(56) References Cited

U.S. PATENT DOCUMENTS

| | | |
|---|---|---|
| 2012/0147030 A1 | 6/2012 | Hankers et al. |
| 2014/0098102 A1* | 4/2014 | Raffle ................ G02B 27/0172 345/440 |
| 2014/0320507 A1* | 10/2014 | Myung ................ G06F 3/0488 345/474 |
| 2016/0048995 A1* | 2/2016 | Sun .................... G06K 9/00476 345/474 |
| 2017/0228913 A1* | 8/2017 | Kogan .................... G06T 17/05 |
| 2018/0348402 A1 | 12/2018 | Elkabetz et al. |

OTHER PUBLICATIONS

Hu et al., "Accuracy of 6-10 Day Precipitation Forecasts and Its Improvement in the Past Six Years", Science and Technology Infusion Climate Bulletin, NOAA's National Weather Service, 7th NOAA Annual Climate Prediction Application Science Workshop, Norman, OK, Oct. 24-27, 2009, 2 pages.

Mell et al., "The NIST Definition of Cloud Computing", Recommendations of the National Institute of Standards and Technology, Special Publication 800-145, Sep. 2011, 7 pages.

* cited by examiner

CREATING AN ANIMATED PICTOGRAM

BACKGROUND

The invention relates generally to the dynamic alteration of a user interface according to user input. The invention relates specifically to the dynamic evolution of a multielement interface according to user eye tracking information.

Hourly, next-day, three, five, seven, ten day and longer weather forecasts are available. Such forecasts include large amounts of information including: cloud cover, temperature, barometric pressure, precipitation probabilities and more. The information may be presented in a variety of different formats.

Useful data regarding a user's gaze may be gathered using a single camera including using a single user facing cellular phone camera. Such data may be used to construct heat maps indicating the duration of time a user spends looking at different portions of a display or different objects.

SUMMARY

Aspects of the disclosure include methods, systems and computer readable media associated with managing application execution. In one aspect a method for creating an animated pictogram includes: generating a set of images depicting a weather forecast for a first location at different times according to a set of depiction rules and combining the set of images in chronological order according to a set of transition rules.

DETAILED DESCRIPTION

The variety of forecast data provided by a weather app can make it difficult to understand the forecast at a glance. An hourly forecast for example, may be represented by a table with one row per hour, and up to a dozen columns for condition, temperature, precipitation amount and probabilities, cloud coverage, wind speed and direction, etc.

There is decreasing confidence, or certainty, in weather forecasting further into the future. For example, a weather forecast for 7 days in advance is not as certain as a weather forecast for 3 days, or 2 days, or 1 day. Though the respective details of each of the 7, 3, 2, or 1 day forecast conditions are certain, the probability that the forecast conditions will actually occur diminishes the further into the future the forecast projects. Weather apps may not display any information reflecting those changes in forecast confidence, or certainty. Without a confidence value, the public may not trust the forecast source. What is needed is an interface to quickly convey useful forecast information including an indication of the conveyed information's confidence or certainty.

Figure 1:
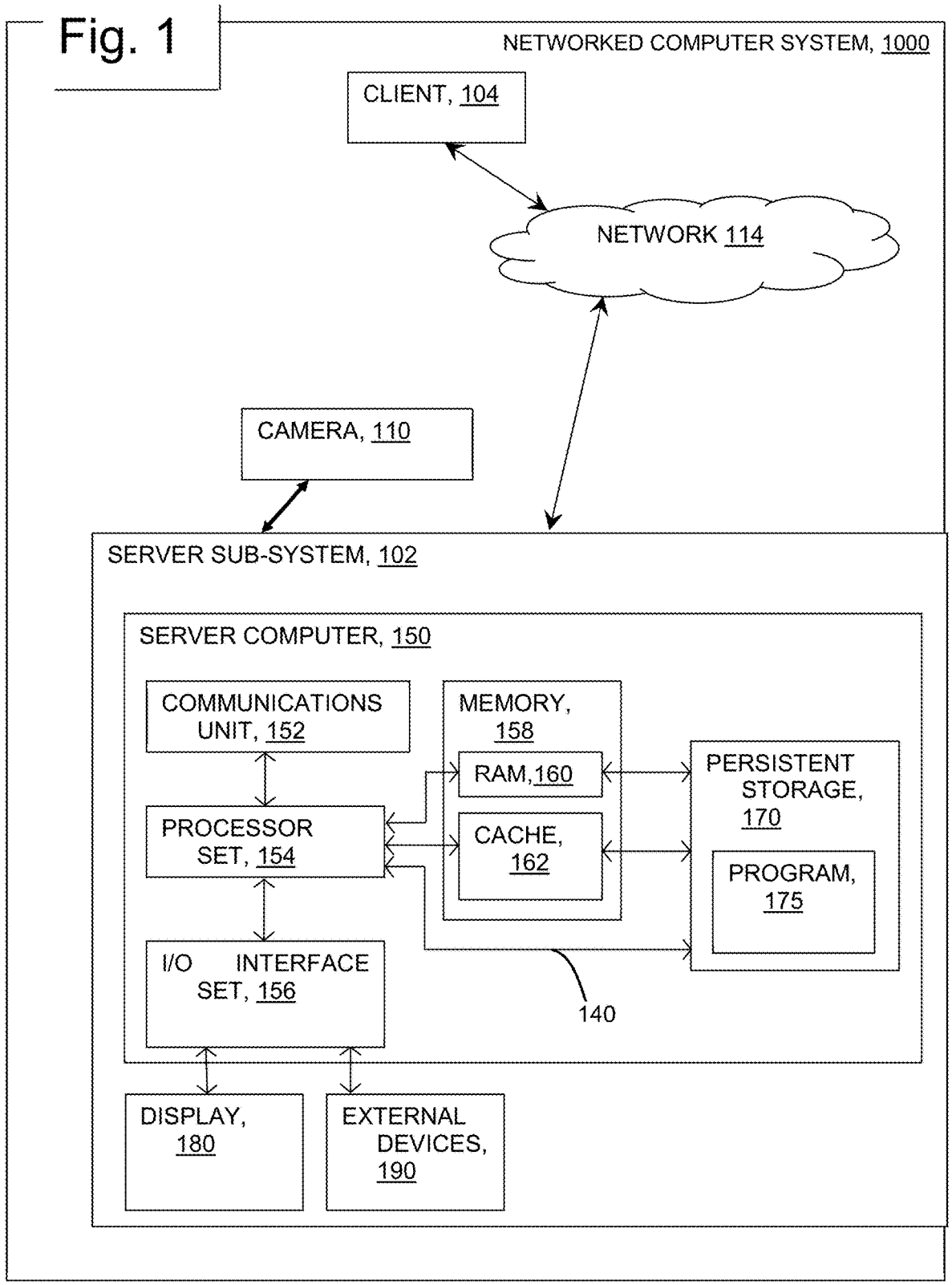
FIG. 1 provides a schematic illustration of a system, according to an embodiment of the invention.

FIG. 1 provides a schematic illustration of exemplary network resources associated with practicing the disclosed inventions. The inventions may be practiced in the processors of any of the disclosed elements which process an instruction stream. As shown in the figure, a networked Camera 110 connects with a hard wire or wirelessly to server sub-system 102. Client device 104 connects wirelessly to server sub-system 102 via network 114. Client devices 104 comprises forecast display program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, cache 162, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the forecast display program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 130. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., forecast display program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

In an embodiment, creating an animated pictogram begins with generating a first image depicting a weather forecast for a location at a particular time. The location can be specified by a user or the location can be derived from location information provided by a device such as a cellular phone. The user may specify a set of locations and the disclosed methods and systems can then be used to create animated pictograms for each specified location for the user.

In an embodiment, the image sequence can begin at the present time, or the user may specify a start time and a duration for the requested forecast. In this embodiment, forecast information can be gathered from one or more forecasting entities including the National Weather Service, the Weather Company and its affiliated sites, and other known forecasting entities. (Note: the term(s) "NATIONAL WEATHER SERVICE" and "WEATHER COMPANY" may be subject to trademark rights in various jurisdictions throughout the world and are used here only in reference to the products or services properly denominated by the marks to the extent that such trademark rights may exist.)

In an embodiment, the image may include a range of the gathered forecast information such as temperature, barometric pressure, wind speed and direction, cloud cover percentage, precipitation likelihood and type, road conditions, sunrise, sunset, high and low tide, moon rise, moon set and moon phase information etc. An image may be created for each forecast unit—hour, half-day, or full day in the requested forecast duration.

The forecast information may be depicted graphically or pictorially. Examples include: sky condition and cloud coverage represented by an image of clouds. The amount of clouds in the image reflect the extent of cloud coverage; while wind is represented by animating at least part of the sky condition image, with the speed and direction of the animation representing the speed and direction of the wind. Strong south winds are represented by the cloud coverage image rapidly moving towards the top of the display (and looping back from the top to the bottom of the display); wind can also be represented by a vector displayed in association with a compass indicating wind direction and speed by the length of the wind vector image. Precipitation can be represented by animated water drops (snowflakes, hail stones, etc.). The number, size, appearance and speed of the drops, used in various and possibly customizable combinations, represent the chances and the amount of precipitation. Low probability precipitation can be depicted using dashed lines for the drops while high probability precipitation can be depicted using solid lines. This representation can appear next to the sky condition pictogram (below, above, left, right) or on top of it. Temperature influences the background color of the pictogram, using common conventions such as blue for cold and red for hot. The color gradient can be based on the real temperature, the "feels like" temperature, the temperature difference with seasonal averages, or any other measure known in the art.

In an embodiment, forecast certainty can be represented by the image clarity of the entire pictogram. A forecast having 100% certainty will result in a crisp pictogram, while a forecast with 50% certainty will look fairly blurry but still decipherable. A forecast having 0% certainty would be blurred to the point where it can no longer be understood. Though generally not communicated to users, confidence, or certainty, can be available in forecast models. If not available from the models, general certainty scores for each type of forecast can be obtained from existing studies associated with the different models.

Additional measures can be added for other measurements. For example, pressure can be represented by a background color, just like temperature, and the background can be split between pressure and temperature. In other embodiments, temperature can be represented by a thermometer, and pressure by a barometer. Time can be represented using an analog clock face or a digital clock reading. Day of the week can be represented using a series of seven labeled blocks with the appropriate block highlighted.

The measurements displayed by the pictogram are customizable. A user can choose the measurements to display, how they are represented, and their initial locations on the display. In an embodiment, a default set of measurements are defined together with their representations and locations to enable a rapid launch of the program. In this embodiment, the user may be presented with a menu of default display configurations having popular measures arrayed in pre-defined relationships, enabling the user to select a configuration containing their desired features arranged in an acceptable manner.

After the images for each forecast unit have been generated, they are composed into a chronologically progressing animated sequence using a set of transition rules to progress from an image to the next image in the animation sequence.

In an embodiment, the set of transition rules can include: changing the number of clouds, cloud speed and direction between the first image and the second image; changing the image background color according to a color gradient selected according to the respective colors of the first and second images; changing the level of image clarity between the first image and the second image according to defined clarity increments to translate from the confidence of the first image to that of the second.

In an embodiment, the transition between images can be spread over a number of intermediate images where the transition rules are used to generate the intermediate images. In this embodiment, the transition from Monday to Tuesday may be depicted over a series of gradually changing images rather than by way of a single sudden change from an image of the average forecast for Monday to an image of the average forecast for Tuesday. The intermediate images may be associated with hourly forecast changes or may be created by dividing the difference between the start and finish images and dividing it among the set of intermediate images. Each intermediate image visually shifts from the previous image toward the final image.

In an embodiment, the animation sequence can be based upon simplified images wherein only a portion of all available information is displayed in each pictogram of the sequence. The selected information may be displayed according to a subset of the depiction rules. In this embodiment, the user can be provided a view of measures of interest as determined by their specifications or by their use habits when viewing more full featured pictograms. In this embodiment, the amount of time a user displays a particular pictogram may be used as a gauge of their interest in the pictogram. Gaze tracking using a cellular phone camera can be used to isolate the portion of the display the user is looking at, how often they view it, and how long they dwell upon it. The portion can be correlated to a particular feature. The listing of all displayed features can be ranked according to user interest as demonstrated by display time or gaze data. User gaze, frequency and dwell time data is collected after the user has opted in to the collection of such data to enable enhancements to the display.

In an embodiment, a user participates in a training period where their usage of full featured displays is monitored to determine which features the user views. These features may then form the basis for a simplified pictogram as the basis for a simplified animation. The analysis can be conducted using a machine learning engine to determine which features are viewed, what order they are viewed in and which features are ignored. The output can include a ranking of viewed features. The ranking can be used to facilitate the creation of the forecast images to be used in the animation. Feature viewed often can be presented in the images displayed in a logical manner. Forecast measures viewed each day can be presented in each day's image. Measures which are ignored can be left out of the created images.

As an example, a user may view each daily forecast as the day begins, but only gaze at the temperature and precipitation portions of the display. No regard is given the hourly forecast, moon phase information, or tide information, which are displayed after today's forecast and before tomorrow's forecast. The user skips the intervening information and proceeds directly to tomorrow's forecast, where again, they only look at the temperature and precipitation aspects of the forecast. This pattern persists until Thursday. On Thursday, the user looks beyond Thursday and Friday, to also check the daily forecast for Saturday and Sunday—again only actually looking at the temperature and precipitation portions. The machine learning engine recognizes this pattern and so begins to generate and present to the user a 48 hour animated pictogram of the temperature and precipitation information every day except Thursday. On Thursday, the engine generates and presents a 72 hour pictogram of the temperature and precipitation information. In an embodiment, the user can be queried over time to determine if additional measures should be added to the pictogram, or the user can manually add features by selecting them from a menu. The user can also specify that they want to return to previous animations or return to the training mode to capture new viewing preferences.

Figure 2:
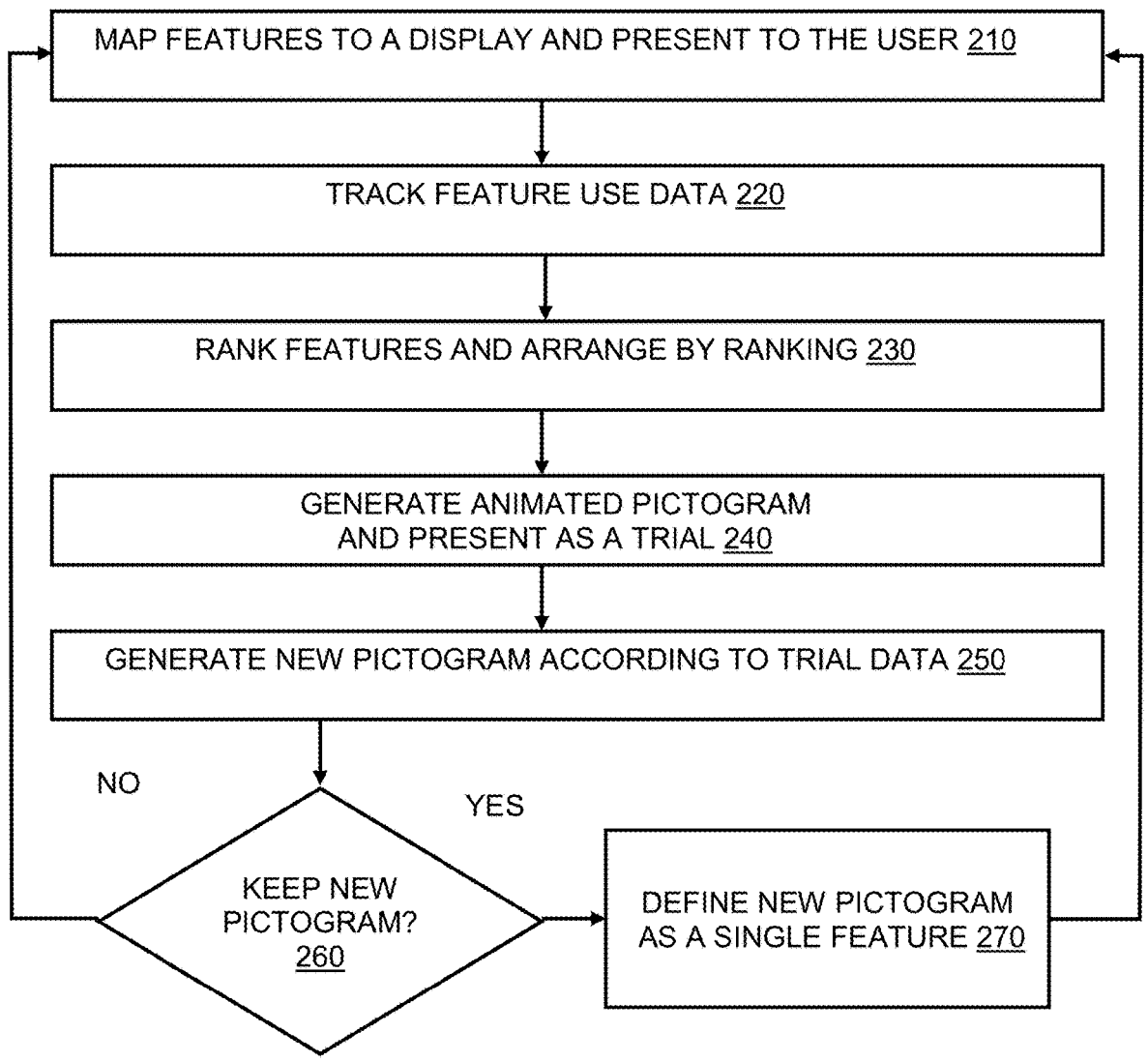
FIG. 2 provides a flowchart depicting an operational sequence, according to an embodiment of the invention.

FIG. 2 provides a flowchart 200 depicting operations steps according to an embodiment of the invention. As illustrated in the figure, at 210, the system processor set 154, running application program 175, maps features to the display 180 for a user. At 220, one or more cameras 110 detect the user's gaze to ascertain which features are observed and which features are ignored. Application program 175, tracks gaze data, viewing frequency, viewing sequences and viewing dwell time. At 230 the processor set 154/application program 175, ranks features using the tracked data and places the features in locations on the image according to their ranking. Highly ranked features may be larger and displayed in the center of the display while more lowly ranked features may be made smaller and placed nearer to the display edges. The program 175, considers each ranked feature and adjusts the composition of the images accordingly. At 240, the program 175 animates the chronological series of images, using a set of transition rules, creating the pictogram. The system outputs the pictogram to the display 180 for the user for a trial period. Gaze and other user data are gathered during the trial period to gauge user acceptance. Depending upon the new gaze data, new images can be created at 250—features which the user ignores can be removed from the images, and edge features receiving extended dwell time moved closer to the center of the display. Direct user input can be received at 260 indicating acceptance and a desire to continue the new images, or rejection and a desire to return to initial display at 210, to try again. Acceptance of the new images can lead to resuming the process at 210 with the set of features of the new images defined as a single feature at 270.

Figure 3:
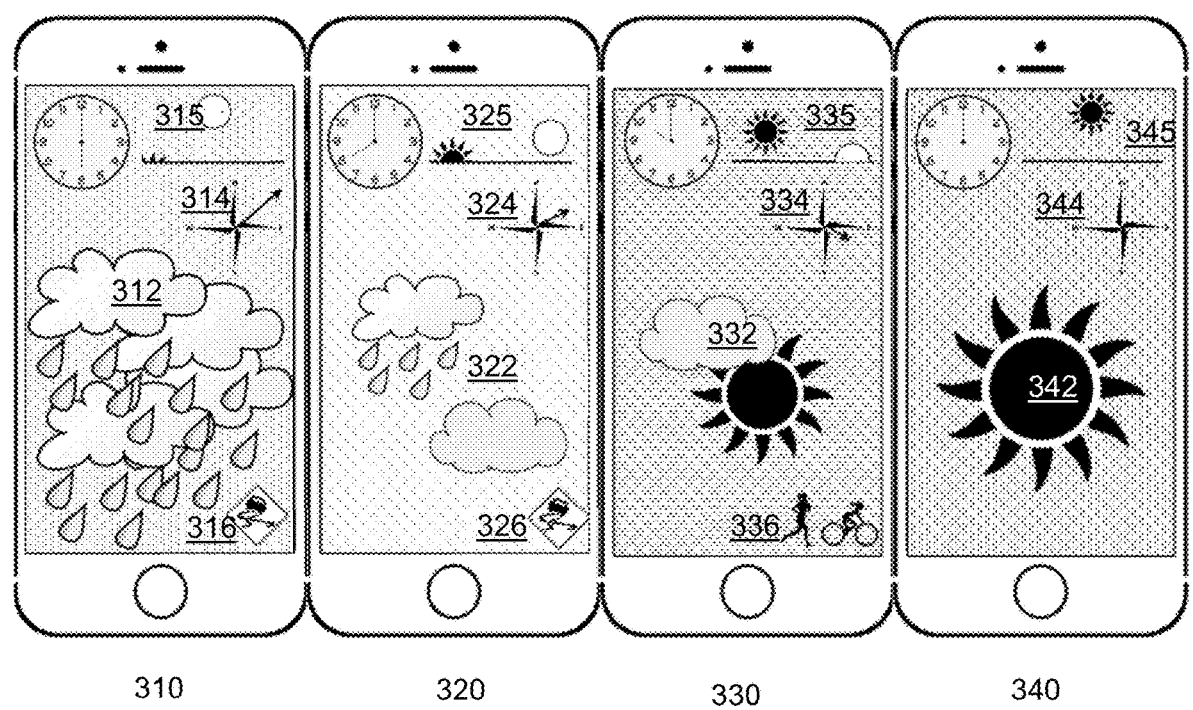
FIG. 3 provides a sequence of images, according to an embodiment of the invention.

FIG. 3 illustrates a series of images forming a portion of an animated pictogram. The four images represent forecast data for 6 am 310, 8 am 320, 10 am 330, and 12 pm 340, respectively. The images reflect a change from heavy rain 312, with slick roads 316, and a Southwest wind 314, at 6 am to light rain 322, slick roads 326, and lessening Southwest winds 324 at 8 am, to partly sunny skies 332, light Northwest winds 334, at 10 am, to sunny skies 342, and no wind 344, at 12 pm. Elements 315, 325, 335, and 345 depict the progression of the sun and moon across the sky as the day progresses from 6 am to 2 pm. The background of each images reflects the forecast temperature changes as the day progresses. Each image is clear reflecting a high level of confidence or certainty of the forecast information.

Figure 4:
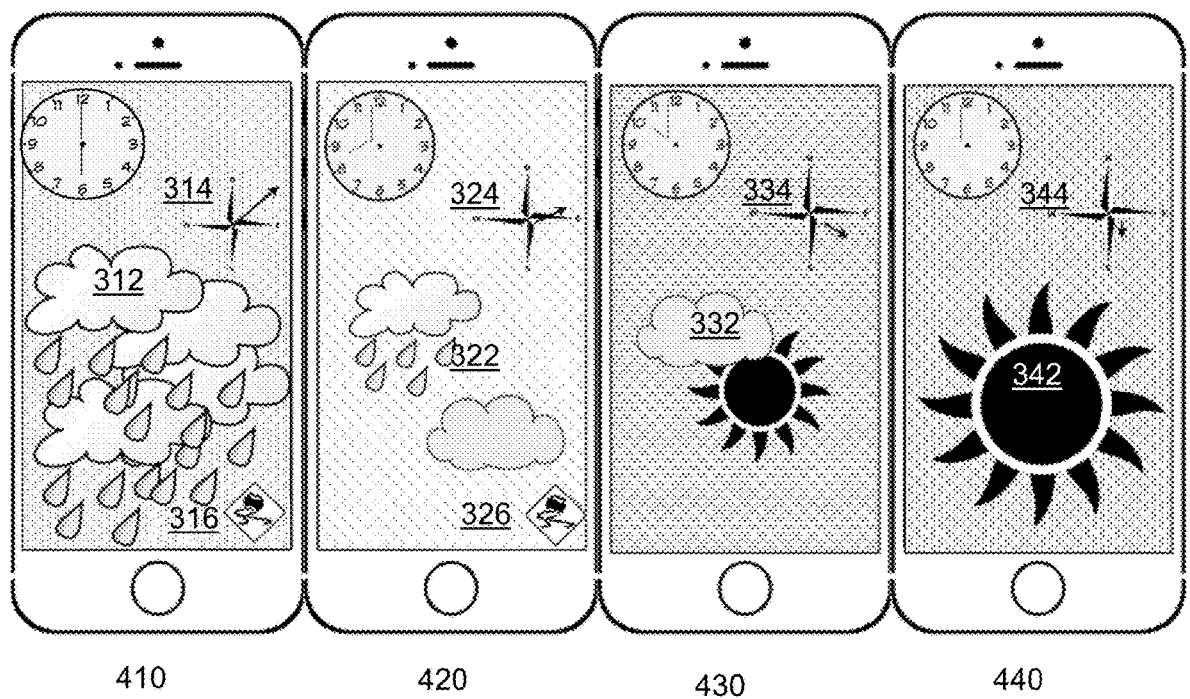
FIG. 4 provides a sequence of images, according to an embodiment of the invention.

In an embodiment, illustrated in FIG. 4 using modified versions of the images of FIG. 3, original composition 310 is observed by a user. The program determines from the gaze data for the images of FIG. 3, that element 315, 325, 335, and 345 are ignored. Elements 314, 324, 334, and 344 are enlarged in images 410, 420, 430 and 440 and elements 315, 325, 335, and 345 are removed from the composite images. Program analysis of gaze data of image 320 indicates that element 326 is ignored so new image composition 330 does not include element 336 of FIG. 3. Composite image 340 enlarges element 342 due to gaze data analysis and the space available after the removal of element 336. As shown in the figure, the transition rules are applied to depict the forecast changes as the image composition is also changed due to gaze data analysis.

Figure 5:
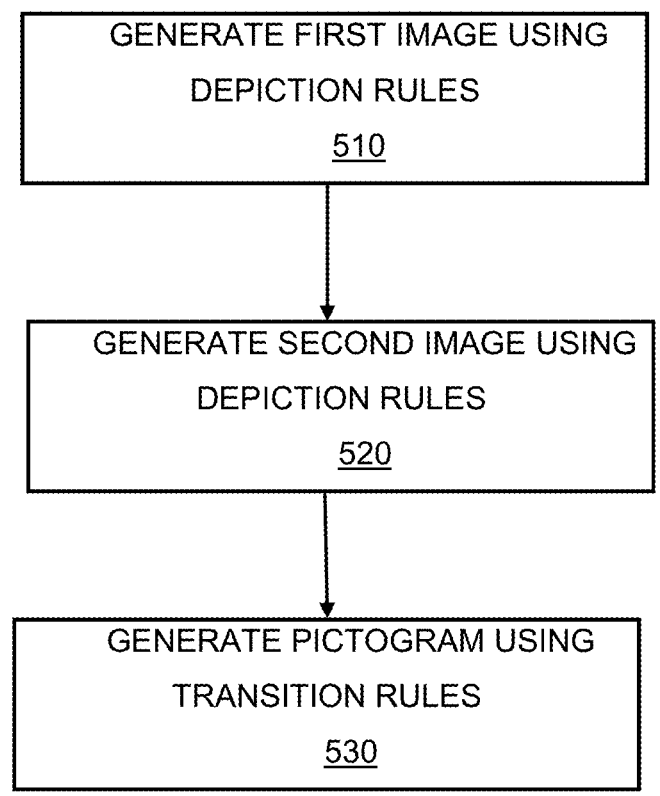
FIG. 5 provides a flowchart depicting an operational sequence, according to an embodiment of the invention.

FIG. 5 depicts a flowchart 500 illustrating an embodiment of the invention. As shown in the figure, with reference to elements of the system depicted in FIG. 1, a processor set 154, running an application program 175, generates a first image depicting a weather forecast for a defined location and a first defined time at 510. The units of time may be hours, half days, days, weeks, or other temporal units selected by the user. The location and time may be selected by a user, or the local location and time of the processing device may be used. The location can be used to select the elements depicted in the generated image. In an embodiment, location relevant data from other users of the application can be used to determine which display elements will and will not be depicted in the image. Display elements popular with most users in the location of a current user can be added to the composite image, display elements ignored by most users in the location can be excluded from the composite image. The program 175 generates a second image for the location at a second time in the future relative to the first defined time at 520. The elements of the second image are similar to those of the first image, differing only in the depiction of data associated with a different time. The program 175 generates images for display according to one or more depiction rules. The depiction rules can include which forecast elements are included in the overall image as well as default placement locations for the different elements in the overall image composition. The default placement locations may be pre-defined in the program. In an embodiment, the user can provide input to the system to arrange the default elements according to the user's preferences. In an embodiment, the default placement locations are determined according to data collected from other users of the application program. In this embodiment, an average user preference for the default elements is determined using gaze data collected from application users. In an embodiment, a user profile may be developed using information provided by the user in combination with information relating to the user's use of the application. The user's profile can then be associated with similar user profiles and the typical or average display element location of the group of similar user profiles can be used to determine the display element locations for the user. In an embodiment, the typical, or average, display element location for other users in the same geographic location as a current user can be used to determine the default placement locations for display elements for a current user. The first and second images are combined into a single chronological pictogram for display on the system display unit according to one or more transition rules at 530. the transition rules define how the elements of the first image will be transformed into the elements of the second image.

The system displays the pictogram to the user for a trial period. The system collects user gaze data relative to the display elements from camera 110. After the trial period, the system can generate simplified images by eliminating elements the user ignored according to the gaze data. As elements are eliminated, they may be replaced with other elements popular with other users of the application or selected from a program listing of alternative elements. A new trial period begins, and gaze data is collected on the new pictogram. In an embodiment, the system eliminates elements according to the gaze data and enlarges remaining elements to occupy the space previously filled by the eliminated elements.

In an embodiment, the method disclosed may be applied to other types of data such as sports, news, or entertainment data. In this embodiment, the system again generates a set of images from a selection of display elements according to a set of depiction rules. The system then tracks the gaze of a user over time as the series of images is presented. The system analyzes the tracking data and adjusts the composition of the images according to direct user input, the viewing frequency, and dwell time associated with the different display elements.

Figure 6:
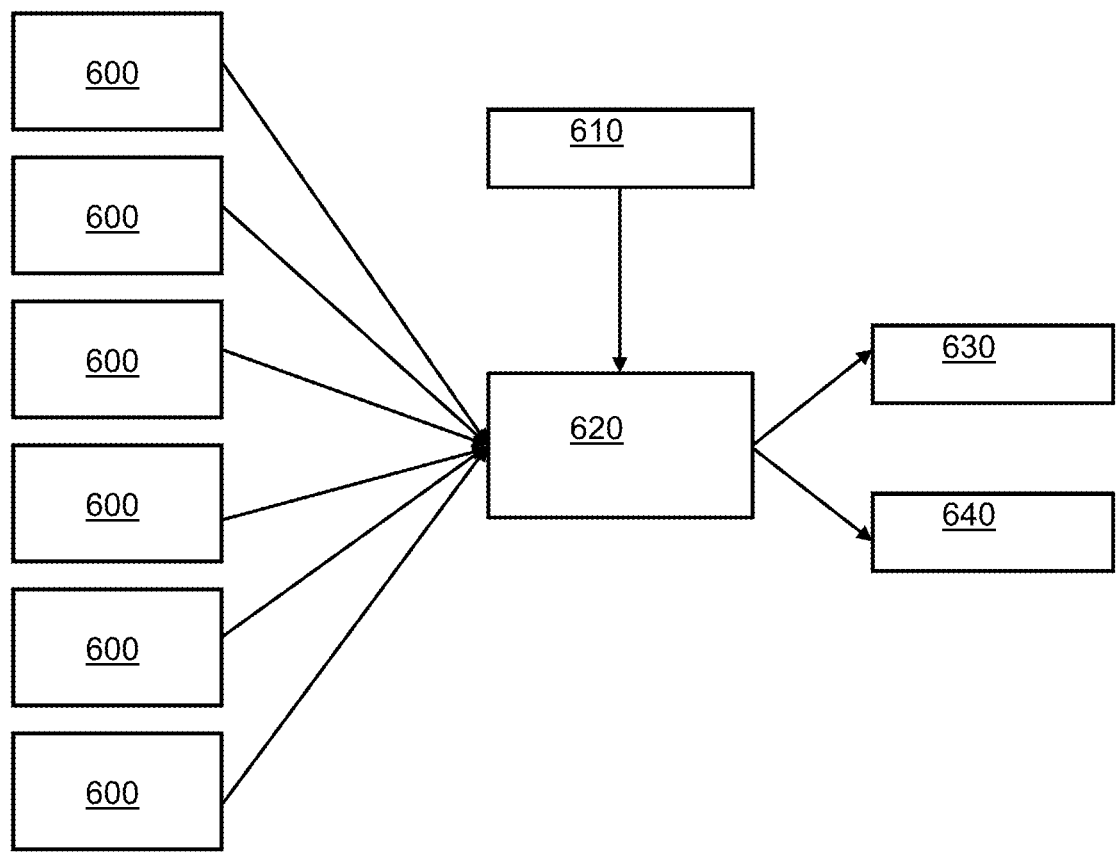
FIG. 6 provides a schematic illustration of a data flow, according to an embodiment of the invention.

In an embodiment, as shown in FIG. 6, with reference to system elements of FIG. 1, gaze data 600, including dwell time and viewing frequency is tracked for a plurality of displayed features and pictograms. The gaze data 600 can be captured using one or more cameras 110 of the system. The camera(s) can be wired or wireless. The program 175 provides the tracked data to a supervised machine learning module 620. The processor set 154, running program 175, collects direct user input 610, at the end of a trial viewing period using a touchscreen display, keyboard, pointing device, or other user input external devices 190. The program trains a supervised machine learning module 620, using the direct user input 610. The system program uses the trained supervised machine learning module to analyze future gaze data and determine if features and pictograms should be retained 630 or discarded 640. A composite image based upon the supervised machine learning results is provided to the display 180 (not shown).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
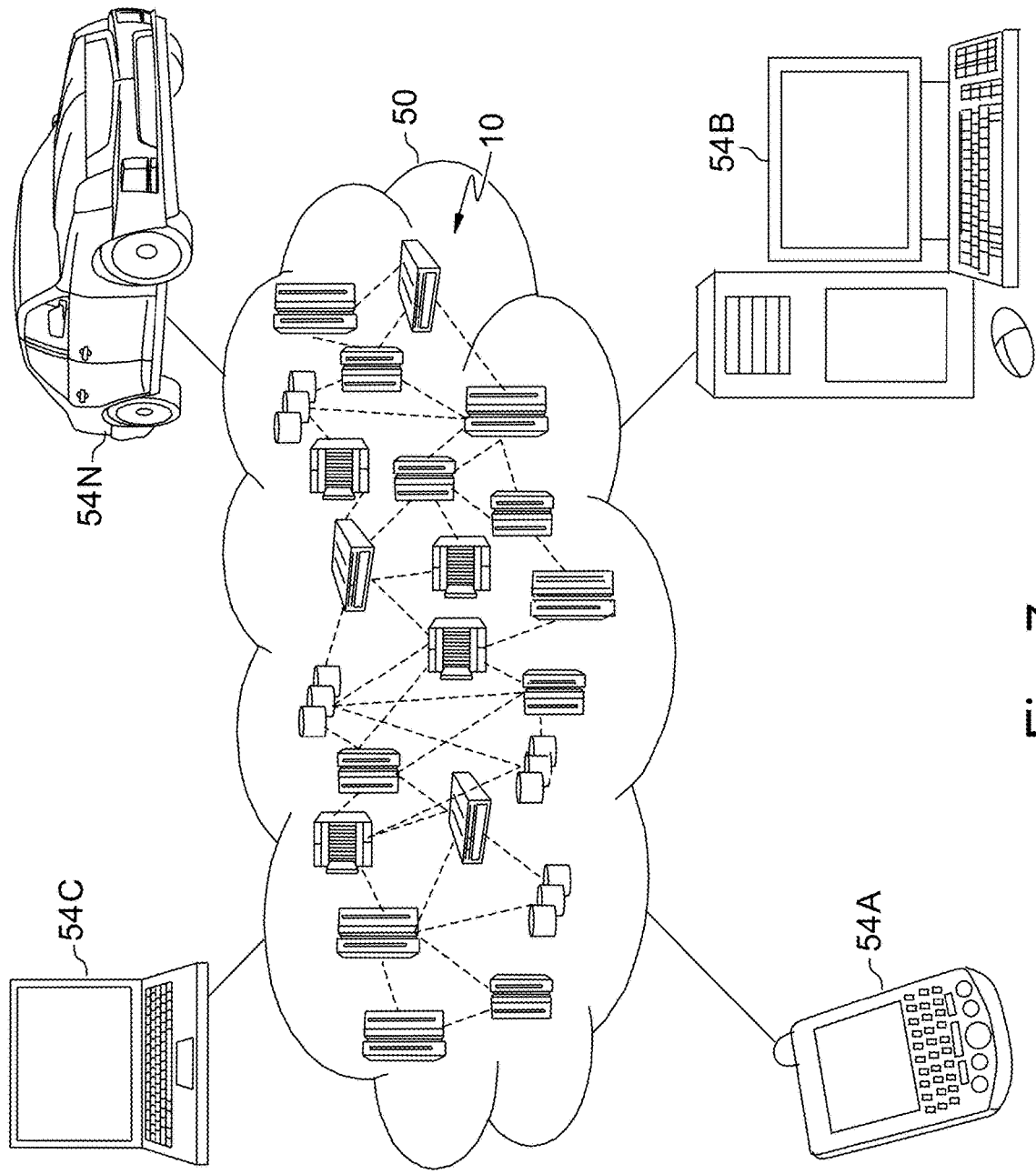
FIG. 7 depicts a cloud computing environment, according to an embodiment of the invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
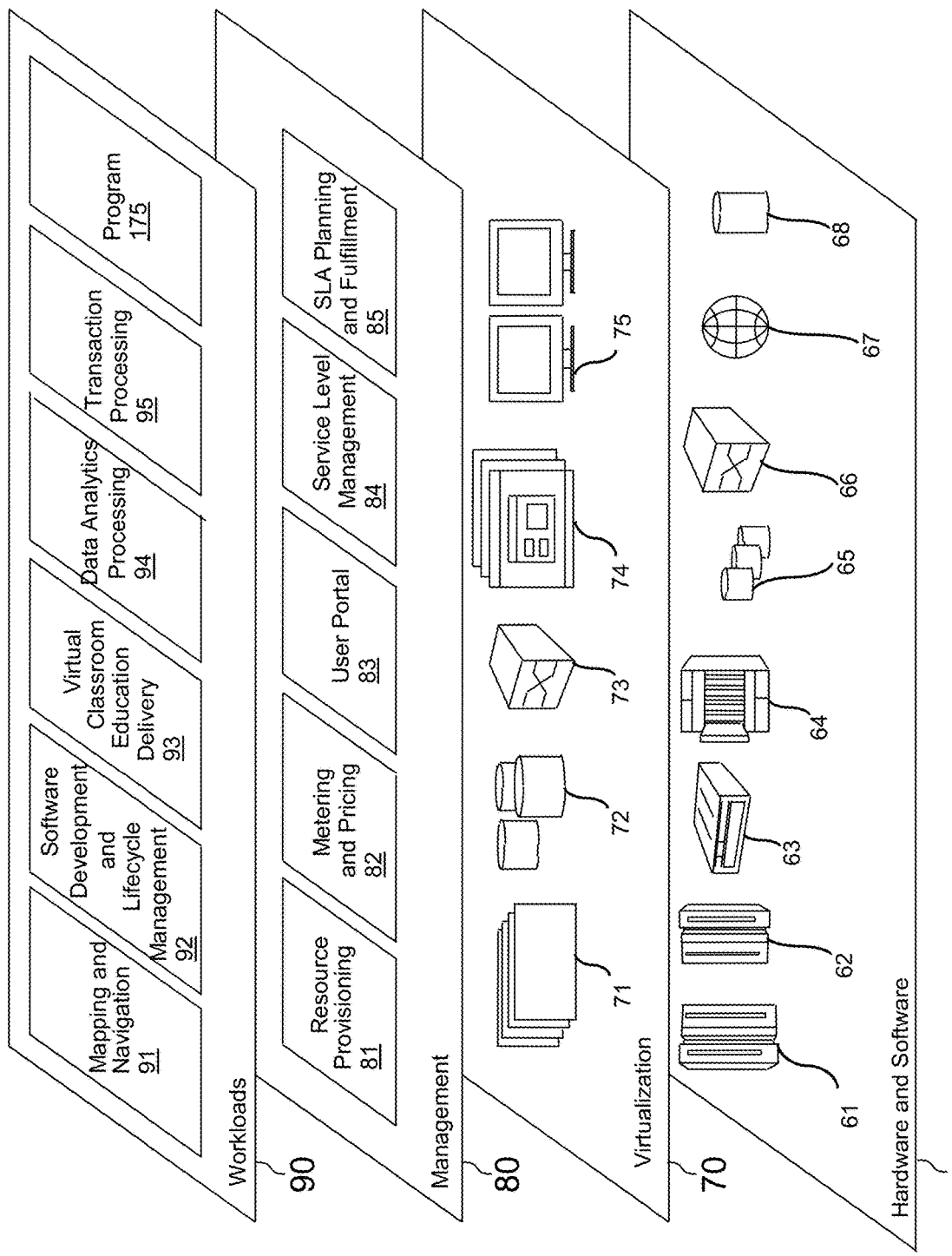
FIG. 8 depicts abstraction model layers, according to an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and forecast display program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A computer implemented method for creating an animated pictogram, the method comprising:
   generating, by one or more computer processors, a first image depicting a weather forecast for a first location at a first time, according to a set of depiction rules;

generating, by one or more computer processors, a second image depicting a weather forecast at the first location at a second time, according to the set of depiction rules;

generating, by one or more computer processors, simplified first and second images according to a subset of the set of depiction rules;

combining, by one or more computer processors, the simplified first and second images to form a simplified animation pictogram;

displaying, by one or more computer processors, the simplified animation pictogram;

creating, by one or more computer processors, an altered animation pictogram by altering the simplified animation pictogram according to a depiction rule; and displaying, by one or more computer processors, the altered animation pictogram; and combining, by one or more computer processors, the first image and the second image in chronological order according to a set of transition rules;

wherein altering, by one or more computer processors, the simplified animation pictogram comprises tracking a user's gaze while viewing the simplified animation pictogram and altering the simplified animation pictogram according to the user's gaze.

2. The method according to claim 1 wherein the set of depiction rules is selected from the group consisting of:

depicting cloud coverage with an amount of clouds;
depicting wind speed and direction by moving clouds at a speed and in a direction,
depicting precipitation with animated precipitation objects;
depicting temperature using an image background color; and
depicting forecast certainty using image clarity.

3. The method according to claim 1, wherein the set of transition rules is selected from the group consisting of:

changing a number of clouds, cloud speed, and direction between the first image and the second image;
changing an image background color according to a color gradient; and
changing a level of image clarity between the first image and the second image according to defined clarity increments.

4. A computer program product for creating an animated pictogram, the computer program product comprising one or more computer readable storage devices and stored program instructions on the one or more computer readable storage devices, the stored program instructions comprising:

programmed instructions for generating a first image depicting a weather forecast for a first location at a first time, according to a set of depiction rules;

programmed instructions for generating a second image depicting a weather forecast at the first location at a second time, according to the set of depiction rules;

program instructions for generating, by one or more computer processors, simplified first and second images according to a subset of the set of depiction rules;

program instructions for combining, by one or more computer processors, the simplified first and second images to form a simplified animation pictogram;

program instructions for displaying, by one or more computer processors, the simplified animation pictogram;

program instructions for creating, by one or more computer processors, an altered animation pictogram by altering the simplified animation pictogram according to a depiction rule; and program instructions for displaying, by one or more computer processors, the altered animation pictogram; and programmed instructions for combining the first image and the second image in chronological order, according to a set of transition rules;

wherein altering, by one or more computer processors, the simplified animation pictogram comprises tracking a user's gaze while viewing the simplified animation pictogram and altering the simplified animation pictogram according to the user's gaze.

5. The computer program product according to claim 4, the set of depiction rules selected from the group consisting of:

depicting cloud coverage with an amount of clouds;
depicting wind speed and direction by moving clouds at a speed and in a direction,
depicting precipitation with animated precipitation objects;
depicting temperature using an image background color; and
depicting forecast certainty using image clarity.

6. The computer program product according to claim 4, the set of transition rules selected from the group consisting of:

changing a number of clouds, cloud speed, and direction between the first image and the second image;
changing an image background color according to a color gradient; and
changing a level of image clarity between the first image and the second image according to defined clarity increments.

7. A computer system for managing application execution, the computer system comprising:

one or more computer processors;
one or more computer readable storage devices;
stored program instructions on the one or more computer readable storage devices for execution by the one or more computer processor, the stored program instructions comprising:

programmed instructions for generating a first image depicting a weather forecast for a first location at a first time, according to a set of depiction rules;

programmed instructions for generating a second image depicting a weather forecast at the first location at a second time, according to the set of depiction rules;

program instructions for generating, by one or more computer processors, simplified first and second images according to a subset of the set of depiction rules;

program instructions for combining, by one or more computer processors, the simplified first and second images to form a simplified animation pictogram;

program instructions for displaying, by one or more computer processors, the simplified animation pictogram;

program instructions for creating, by one or more computer processors, an altered animation pictogram by altering the simplified animation pictogram according to a depiction rule; and program instructions for displaying, by one or more computer processors, the altered animation pictogram; and programmed instructions for combining the first image and the second image in chronological order, according to a set of transition rules;

wherein altering, by one or more computer processors, the simplified animation pictogram comprises tracking a user's gaze while viewing the simplified animation pictogram and altering the simplified animation pictogram according to the user's gaze.

8. The computer system according to claim 7, the set of depiction rules selected from the group consisting of:

depicting cloud coverage with an amount of clouds;

depicting wind speed and direction by moving clouds at a speed and in a direction;

depicting precipitation with animated precipitation objects;

depicting temperature using an image background color; and depicting forecast certainty using image clarity.

9. The computer system according to claim 7, the set of transition rules selected from the group consisting of:

changing a number of clouds, cloud speed, and direction between the first image and the second image;

changing an image background color according to a color gradient; and changing a level of image clarity between the first image and the second image according to defined clarity increments.

* * * * *